(12) United States Patent
Du et al.

(10) Patent No.: US 10,800,363 B2
(45) Date of Patent: Oct. 13, 2020

(54) ANALOG-TO-DIGITAL FAULT DETECTION, ISOLATION, AND MITIGATION FOR A LOW-VOLTAGE COMMUNICATIONS NETWORK

(71) Applicant: GM Global Technology Operations LLC, Detroit, MI (US)

(72) Inventors: Xinyu Du, Oakland Township, MI (US); Shengbing Jiang, Rochester Hills, MI (US); Dongyi Zhou, Sterling Heights, MI (US); David Gumpert, Farmington Hills, MI (US); Atul Nagose, Royal Oak, MI (US); Rod Niner, Royal Oak, MI (US); Aaron D. Motyl, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 400 days.

(21) Appl. No.: 15/707,115

(22) Filed: Sep. 18, 2017

(65) Prior Publication Data

US 2019/0084510 A1    Mar. 21, 2019

(51) Int. Cl.
*B60R 16/03*    (2006.01)
*B60R 21/01*    (2006.01)

(52) U.S. Cl.
CPC .......... *B60R 16/0315* (2013.01); *B60R 21/01* (2013.01); *B60R 2021/0104* (2013.01); *B60R 2021/01156* (2013.01); *B60R 2021/01163* (2013.01)

(58) Field of Classification Search
CPC ................ B60R 16/0315; B60R 21/01; B60R 2021/0104; B60R 2021/01156; B60R 2021/01163
USPC ......................................... 324/538, 503, 678
See application file for complete search history.

(56) References Cited

U.S. PATENT DOCUMENTS

| 6,314,380 | B1 * | 11/2001 | Seip ...................... B06B 1/0215 |
| | | | 280/735 |
| 9,009,523 | B2 | 4/2015 | Jiang et al. |
| 9,110,951 | B2 | 8/2015 | Jiang |
| 9,354,965 | B2 | 5/2016 | Jiang et al. |
| 9,568,533 | B2 | 2/2017 | Jiang et al. |
| 9,678,131 | B2 | 6/2017 | Jiang et al. |
| 9,678,847 | B2 | 6/2017 | Du et al. |
| 2016/0320441 | A1 | 11/2016 | Du et al. |
| 2017/0153282 | A1 | 6/2017 | Du et al. |

(Continued)

*Primary Examiner* — Akm Zakaria
(74) *Attorney, Agent, or Firm* — Quinn IP Law

(57) ABSTRACT

A system includes control modules, a low-voltage communications bus, e.g., a CAN bus of a vehicle, a voltage sensor that measures a bus voltage and outputs 2.5-3.5 VDC high-data and 1.5-2.5 VDC low-data, and a host electronic control unit (ECU). The host ECU detects a recoverable fault using a data pattern in the bus voltage data when the data is outside of a calibrated range, and recalibrates the sensor. Recalibration may be by adjustment to a scaling factor and/or a bias value. Non-recoverable "stuck-at-fault"-type or "out-of-range"-type faults may be detected using the pattern, as may be a ground offset fault. A method includes measuring the bus voltage using the sensor, comparing the output data to a range to detect the fault, and isolating a sensor fault as a recoverable fault using the data pattern when the data is outside of the range. The sensor is then be recalibrated.

18 Claims, 3 Drawing Sheets

(56) References Cited

U.S. PATENT DOCUMENTS

| | | | |
|---|---|---|---|
| 2018/0091550 A1* | 3/2018 | Cho | H04L 63/1466 |
| 2019/0077272 A1* | 3/2019 | Newman | H02J 7/0063 |
| 2019/0245872 A1* | 8/2019 | Shin | H04L 12/40 |

* cited by examiner

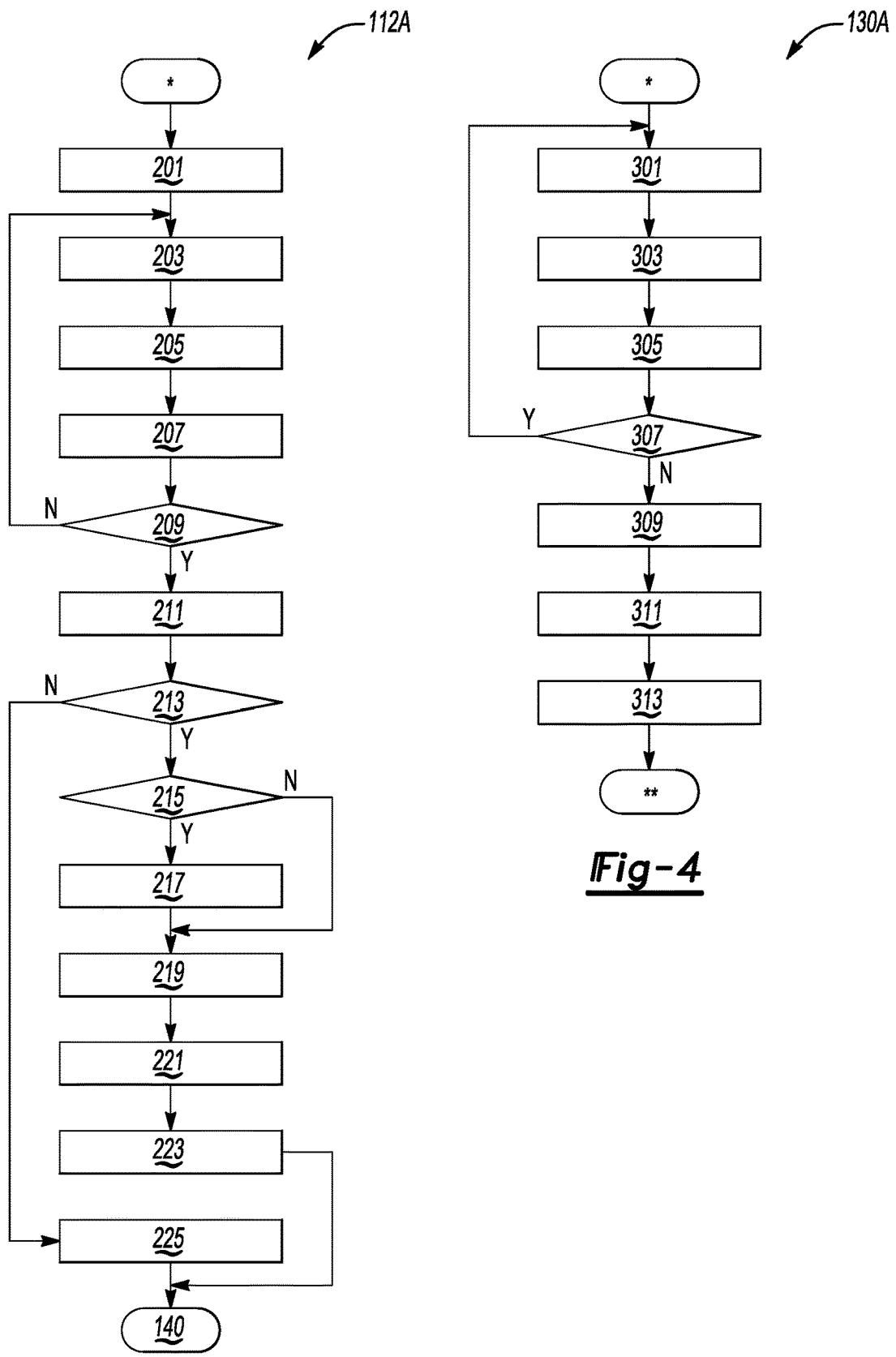

ANALOG-TO-DIGITAL FAULT DETECTION, ISOLATION, AND MITIGATION FOR A LOW-VOLTAGE COMMUNICATIONS NETWORK

INTRODUCTION

Complex systems include a wide variety of interrelated and/or independent subsystems, with each subsystem controlled via a corresponding electronic control module. The various control modules communicate with each other and a host controller/electronic control unit (host ECU) over a serial communications bus. In a vehicle, for instance, a low-voltage differential controller area network (CAN) bus is used for this purpose. From time to time, certain faults may occur in one or more of the control modules and/or a voltage sensor used to monitor the bus voltage. Such faults may lead to degraded system functionality if improperly diagnosed and serviced.

Certain low-voltage bus faults may be detected by the host ECU using a process of signal supervision and time-out monitoring. Signal faults may be reported as a loss of communications, e.g., a loss of a communicated data message. Other bus faults may be detected by comparing data from the voltage sensor to a calibrated threshold. The control modules may be connected in electrical parallel, such that the various control modules share a bus voltage in common, i.e., the same voltage is applied to the various connected controllers. Issues may arise with regard to accurate fault identification whenever the voltage sensor readings appear to be abnormal. In such instances, it may be unclear as to whether the sensor readings are due to a malfunctioning sensor or an actual fault on the communications network.

SUMMARY

A method and system are disclosed herein for detecting, isolating, and mitigating certain sensor-based faults in a low-voltage serial communications network bus having multiple connected control modules, such as but not limited to a controller area network (CAN) bus of a vehicle. A voltage sensor measures a voltage level on the network bus. Such a voltage sensor, which may reside outside of or within a host electronic control unit (ECU), may be improperly calibrated, or certain sensor faults may register due to circuit faults such as open circuit or short circuit faults, reference voltage errors, or host ECU grounding faults. As a result, reliance on the measured voltage in a network diagnosis and prognosis process may lead to false positive or false negative results. The present disclosure is intended to provide improved diagnostic functionality avoiding such inaccurate test results using a decision tree approach as set forth herein.

Using the disclosed method, different sensor faults or host ECU faults are detected and isolated using expected/normal bus voltage data patterns. Techniques for data filtering, data segmenting, and statistical modeling are also developed to help mitigate recoverable-types of faults, such as those caused by sensor calibration errors, improper host ECU grounding, and the like. The disclosed approach is used in conjunction with and geared toward improving the overall accuracy of existing network diagnostic and prognostic algorithms.

In an example embodiment, a system includes a plurality of control modules, a low-voltage serial communications bus having a bus voltage, a voltage sensor, and the host ECU noted above. The voltage sensor measures the bus voltage, which is then converted via an analog-to-digital converter (ADC) into a set of bus voltage data. For an optional differential bus, such as a CAN bus, the output data will include both high-side and low-side measurements, e.g., 2.5-3.5 VDC (high-side) and 1.5-2.5 VDC (low-side) for the example CAN bus. The host ECU, which may contain the voltage sensor and the ADC in some embodiments, is connected to the control modules via the communications bus, and is configured to detect a recoverable fault using a pattern in the bus voltage data when the voltage data is not normal relative to a calibrated or expected voltage range. The host ECU also recalibrates the voltage sensor to mitigate the recoverable-type of fault.

A method is also disclosed herein for detecting, isolating, and mitigating a bus fault in a low-voltage serial communications network having a host ECU in communication with or connected to the control modules as noted above. The method includes measuring the bus voltage using the voltage sensor, with the bus voltage being common to/the same for the host ECU and the control modules. The method also includes converting the measured bus voltage to bus voltage data indicative of the measured bus voltage, and comparing the bus voltage data to a calibrated voltage range to detect the bus fault. Additionally, the host ECU isolates the detected bus fault as a recoverable fault using a data pattern in the bus voltage data, which occurs when the bus voltage data is outside of the calibrated voltage range. Thereafter, the method includes recalibrating the voltage sensor via the host ECU to mitigate the detected recoverable-type of fault.

The above-noted and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a flow chart depicting an example embodiment for performing a data filtering and mean extraction sub-process as part of the method of FIG. 2.

FIG. 4 is a flow chart depicting an example embodiment for performing an outlier removal and recalibration sub-process as part of the method of FIG. 2.

Figure 1:
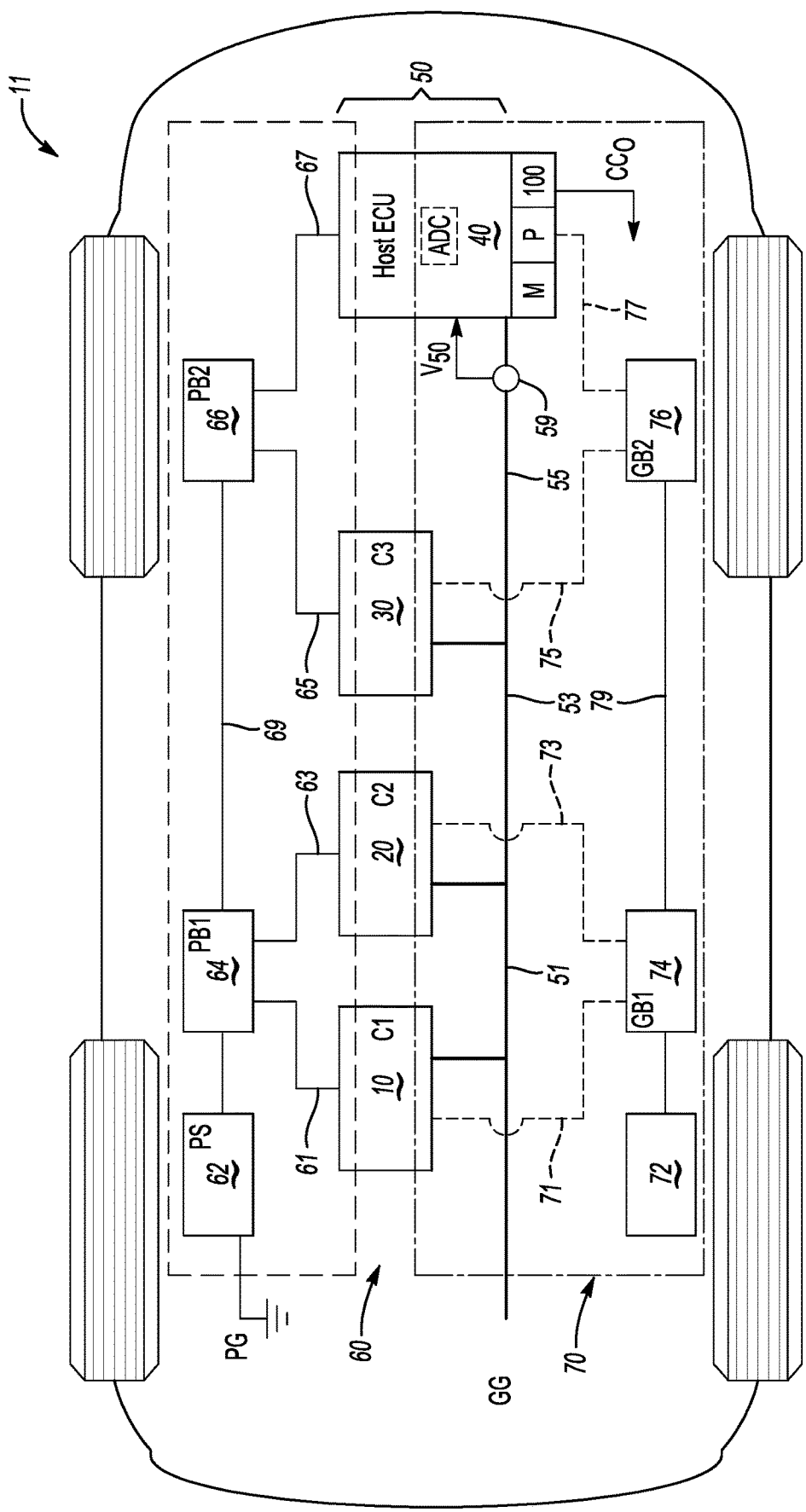
FIG. 1 is a schematic depiction of a system in the form of an example vehicle having a controller area network (CAN) bus connecting multiple control modules to a host electronic control unit (ECU), with the host ECU configured to execute a method for detecting, isolating, and mitigating recoverable-types of bus faults as set forth herein.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, an example system is shown schematically in FIG. 1 as a vehicle 11. The vehicle 11, or another top-level system in other embodiments, includes a low-voltage communications bus 50, such as a controller area network (CAN) bus as shown, through which a plurality of application-specific control modules 10, 20, and 30 are connected to a host electronic control unit (ECU) 40. The control modules 10, 20, and 30 are respectively labeled C1, C2, and C3. While three control modules 10, 20, and 30 are shown for illustrative simplicity, fewer or additional control modules may be used on the communications bus 50 within the scope of the disclosure.

The host ECU 40 is configured to execute computer-readable instructions embodying a method 100 for diagnosing, isolating, and mitigating certain types of faults on the communications bus 50 using available network data, including a measured bus voltage (arrow $V_{50}$) from a voltage sensor 59. The host ECU 40 may be an off-board diagnostic tool, i.e., located external to the vehicle 11 and used to measure the bus voltage through a vehicle port (not shown). While the voltage sensor 59 is shown separately from the host ECU 40 for illustrative clarity, the voltage sensor 59 and an analog-to-digital converter (ADC) may be integral with or part of the circuitry of the host ECU 40. Patterns in measured and output bus voltage data from the voltage sensor 59 and ADC are used for this purpose. An example embodiment of the method 100 is described in further detail below with respect to FIGS. 2-4. While a differential CAN bus having high-side and low-side voltage data is described hereinafter for illustrative consistency, the present disclosure is not limited to vehicular embodiments in general or CAN-applications in particular, but rather is applicable to systems of various types using low-voltage data communication between multiple electronic controllers over the serial communications bus 50.

As will be appreciated by those of ordinary skill in the art, the CAN bus protocol allows connected controllers and devices to communicate with each other with low-voltage data signals within the vehicle 11. The CAN bus protocol uses a two-wire balanced signaling scheme as defined by ISO-11898-2, which specifies a two-wire differential in which a number of nodes is limited by the electrical bus load. The two wires of a CAN bus are identified as the CAN high-side ($CAN_H$) and CAN low-side ($CAN_L$). In an exemplary CAN embodiment, the characteristic impedance of the communications bus 50 is 120Ω and the common mode voltage ranges from −2 VDC on $CAN_L$ to +7 VDC on $CAN_H$. The $CAN_L$ voltage is generally in the range of 1.5-2.5 VDC while $CAN_H$ voltage ranges from 2.5-3.5 VDC. Each node is able to send and receive messages, but not simultaneously. Each received message includes a bit identifier that represents the priority of the message, i.e., an 11-bit identifier (CAN 2.0A) or an extended 29-bit identifier (CAN 2.0B).

The CAN protocol also specifies two logical states, i.e., recessive and dominant. A differential voltage is used to represent the recessive and dominant states (i.e., bits). In the recessive state (logical state=1), the differential voltage on $CAN_H$ and $CAN_L$ is less than a minimum threshold. In the dominant state (logical state=0), the differential is greater than the minimum threshold. Bus data is transmitted as message packets, commonly referred to as frames, with each frame separated from prior frames by a bit field called an inter-frame space. The inter-space frame consists of at least three consecutive recessive bits. Thus, following receipt of the consecutive recessive bits, receipt of a dominant bit is regarded by the host ECU 40 as a start of the next frame.

In the particular configuration shown in FIG. 1, the control modules 10, 20, and 30 and the host ECU 40 are configured to receive or forward data over the communications bus 50 as part of their normal function. To this end, each control module 10, 20, 30 and the host ECU 40 is electrically connected to respective power and ground grids 60 and 70 (PG and GG, respectively). That is, each control module 10, 20, 30 and the host ECU 40 transmits and receives bit messages over the communications bus 50, with such messages conforming to a predetermined message format, and with message transmission rates possibly occurring at different periods. While not limited to a specific system or functional embodiment, the control module 10, 20, 30 may be variously embodied in an example vehicle configuration as an engine control module, transmission control module, body control module, battery control module, etc.

The communications bus 50 of FIG. 1 also includes a plurality of communications links, including a first communications link 51 between the control modules 10 and 20, a second communications link 53 between the control modules 20 and 30, and a third communications link 55 between the control module 30 and host ECU 40. The power grid 60 may include a power supply (PS) 62, e.g., a battery that electrically connects to a first power bus (PB1) 64 and a second power bus (PB2) 66 to provide electric power to the control modules 10, 20, and 30 and the host ECU 40.

The power supply 62 of FIG. 1 may connect to the first and second power buses 64 and 66 via power links arranged in a series configuration, with a power link 69 connecting the first and second power buses 64 and 66. The first power bus 64 may connect to the control modules 10 and 20 via power links arranged in a star configuration, with power link 61 connecting the first power bus 64 and the control module 10 and a power link 63 connecting the first power bus 64 to the control module 20. The second power bus 66 may similarly connect to the control modules 30 and 40 via power links arranged in a star configuration, e.g., with a power link 65 connecting the second power bus 66 and the control module 30 and a power link 67 connecting the second power bus 66 to the host ECU 40.

The ground grid 70 includes a vehicle ground 72 that connects to a respective first and second ground bus 74 and 76 (GB1, GB2) to provide electrical ground to the control modules 10, 20, and 30 and the host ECU 40. That is, the vehicle ground 72 connects to the first and second ground buses 74 and 76 via ground links arranged in a series configuration, e.g., with a ground link 79 connecting the first and second ground buses 74 and 76. The first ground bus 74 connects to the control modules 10 and 20 via ground links that are arranged in a star configuration, with a ground link 71 connecting the first ground bus 74 and the control module 10, and a ground link 73 connecting the first ground bus 74 to the control module 20. The second ground bus 76 connects to the control module 30 and the host ECU 40 via ground links arranged in a star configuration, such as with a ground link 75 connecting the second ground bus 76 and the control module 30 and another ground link 77 connecting the second ground bus 76 to the host ECU 40. Other topologies for distribution of communications, power, and ground for the control modules 10, 20, and 30, the host ECU 40, and the communications bus 50 may be employed to similar effect.

The control modules 10, 20, and 30 and the host ECU 40 may be configured as various combinations of one or more of processors, e.g., Application Specific Integrated Circuits (ASICs), electronic circuits, central processing units, or microprocessors, and sufficient amounts and configurations of associated memory, including read only, programmable read only, random access, optical, and/or magnetic memory. The host ECU 40 executes one or more software or firmware programs to execute the present method 100, an example embodiment of which is depicted in FIGS. 3-4, to provide the described functionality.

As shown in FIG. 1, the control modules 10, 20, and 30 and the host ECU 40 are arranged in electrical parallel, and thus share a common bus voltage, i.e., the same bus voltage is seen by the control modules 10, 20, and 30 and the host ECU 40. Thus, the voltage sensor 59 may be connected to the communications bus 50 and configured to measure and report the bus voltage (arrow $V_{50}$) to the host ECU 40, with the bus voltage (arrow $V_{50}$) consisting of the respective high-side and low-side $CAN_H$ and $CAN_L$ data noted above. In response to the received bus voltage (arrow $V_{50}$), or more specifically to the corresponding data once the measured voltage has undergone digital conversion, the host ECU 40 executes the method 100 using a processor (P) and associated memory (M) to thereby detect and isolate certain faults, such as a stuck-in-range faults, open circuit or short circuit faults, and grounding errors, and to ultimately execute an appropriate control action to mitigate the faults, e.g., via transmission of control signals (arrow $CC_O$) and/or registering of appropriate diagnostic codes triggering repair as needed.

The host ECU 40 ultimately determines the measured voltage (arrow $V_{50}$) as a quantized digital value. An analog-to-digital conversion process may be performed on a raw analog signal via an analog-to-digital converter (ADC), which like the voltage sensor 59 may reside within the host ECU 40, to provide a digital sensor reading as the measured bus voltage (arrow $V_{50}$). This may include high-side and low-side voltage data as described below, i.e., when the bus 50 is a differential bus, and acted on by the host ECU 40 in executing the remainder of the method 100. Thereafter, the host ECU 40 receives the bus voltage data, compares the received bus voltage data to a calibrated voltage threshold to detect a fault on the bus 50. The host ECU 40 thereafter isolates the detected fault, i.e., identifies the fault as a specific type of fault, in particular a recoverable-type of sensor fault. This is accomplished using a data pattern in the bus voltage data when the bus voltage data is outside of the calibrated voltage range. As a control action, the host ECU 40 may thereafter recalibrate the voltage sensor to mitigate the detected recoverable-type of sensor fault.

Fault Modeling

In a logical formulation, the variable x represents an actual bus voltage on the communications bus 50, y represents the sensor reading from the voltage sensor 59, and w represents a zero-mean low level of voltage measurement noise. For a healthy voltage sensor 59, therefore, y=x+w. Certain categories of bus faults may be determined from this mathematical relationship, including:

I. Stuck-At-Fault: y=ax+b+w, a=0 or a→0 (i.e., y is constant)
II. Out-of-Range: y hits a saturation limit, e.g., 5 VDC.
III. Recoverable Sensor: y=ax+b+w, !(a=1 AND b=0)

where a and b are a scaling factor and a bias value, respectively. In recoverable types of bus faults, if the initial calibration of the voltage sensor 59 is incorrect, then a and/or b will not be accurate. Thus, a corrective action exists in that the calibrations can be modified by or using the host ECU 40, or offline, as disclosed later herein with particular reference to FIG. 4.

Fault Signatures

For Fault Type I noted above, i.e., a stuck-at-fault-type of fault, possible root causes include an electrical short in a sensor circuit with which the voltage sensor 59 measures the bus voltage ($V_{50}$), or a short in a protection diode located within such a circuit. Alternatively, the resistance in an ADC circuit used to perform the above-noted ADC conversion may be too small, or a software calibration error may be present. A typical fault signature for Fault Type I is that all control modules on the communications bus 50, e.g., the control modules 10, 20, and 30 of FIG. 1, are active/transmitting and receiving messages properly, and that variance in reported data from the voltage sensor 59 remains low.

For Fault Type II, i.e., out-of-range-type of faults, possible root causes include the actual bus voltage, i.e., x in the above modeled formulation, being out of range, or that the sensor circuit is shorted to power or ground, i.e., x is constant and out of range. Alternatively, the ADC reference voltage may decrease, indicating that the actual bus voltage x saturates the ADC, or a sensor ground fault may be present as indicated by a shifting of x out of range. Fault signatures for Type II faults may include all control modules being active and more than $N_1$ data points being present in [0, $\delta$]||$V_{HH}$, or $V_{LH}$ lies within ($V_{50}-\delta$, $V_{50}$], with $V_{HH}$ being dominant mean for provided $CAN_H$ data, $V_{LH}$ being the recessive mean for the $CAN_L$ data, and the voltage sensor 59 having an effective measurement range defined as [0+$\delta$, $V_{50}-\delta$], with $\delta>0$.

For Fault Type III, i.e., recoverable-types of faults, this may be caused by the ADC reference voltage changing such that a≠1 in the formulation y'=ax+b+w. Similarly, recoverable faults may be caused by incorrect software calibration or a ground offset at the electrical ground of the voltage sensor 59, i.e., a≠1 AND/OR b≠0. This condition also allows for calibration as a control action as set forth below. In this fault, all control modules are active, and extracted two means of data deviate from normal levels, again as described below.

Sensor Fault Detection

Figure 2:
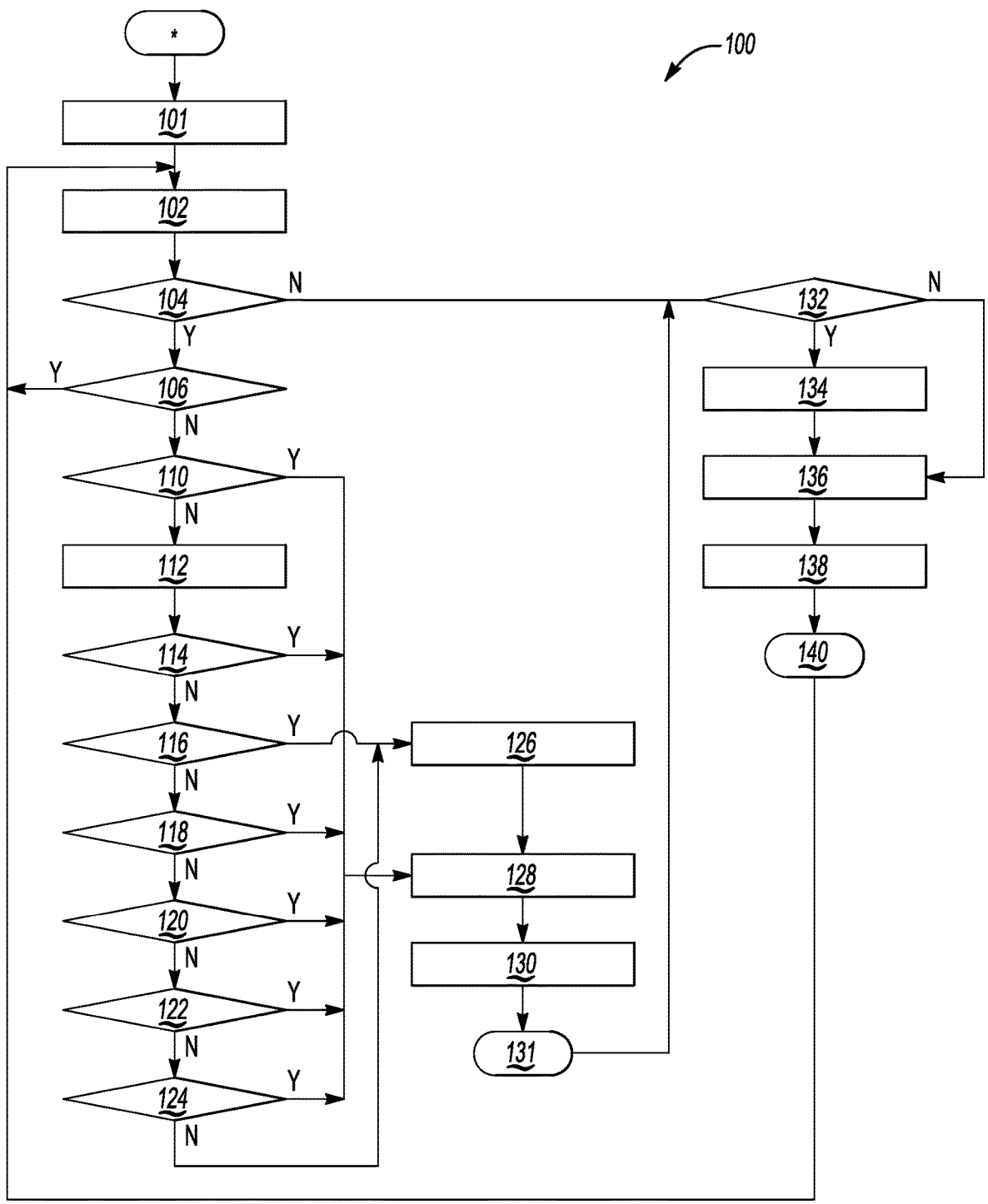
FIG. 2 is a flow chart describing a method for detecting, isolating, and mitigating bus faults on the communications bus of FIG. 1 as set forth herein.

Referring to FIG. 2, after startup (*) of the vehicle 11, the method 100 commences with block 101 and initialization of the communication bus 50 of FIG. 1, such as in response to a key-on event or ignition event, and then proceeds to block 102 where the host ECU 40 receives the measured bus voltage (arrow $V_{50}$) from the voltage sensor 59 with the constituent $CAN_H$ and $CAN_L$ data.

Blocks 102-124 ultimately determine whether the voltage sensor 59 of FIG. 1 is functioning properly/normally, with a diagnosis that recovery is or is not possible from a given fault, e.g., via software calibration. Depending on whether the voltage sensor 59 is functioning normally, different combinations of hardware and software-based diagnostics and prognostics are then executed in blocks 134-138 as described below.

Block 102 includes measuring the bus voltage (arrow $V_{50}$) using the voltage sensor 59 and reporting the measured voltage to the host ECU 40 as high-side and low-side $CAN_H$ and $CAN_L$ data. The method 100 then proceeds to block 104.

At block 104, the host ECU 40 next determines whether all control modules on the communications bus 50 are active, e.g., the control units 10, 20, and 30 and the host ECU 40 of FIG. 1. Block 104 may include monitoring message traffic on the communications bus 50 and verifying that the control modules 10, 20, and 30 and the host ECU 40 are actively communicating by transmitting and receiving messages. Block 104 may also include monitoring bus data for error frames. The method 100 proceeds to block 106 when all control modules are active, and to block 132 in the alternative when all of the control modules are not active.

Block 106 includes determining if the measured voltage data received at block 102 is normal relative to calibrated/expected voltage ranges. If so, the method 100 returns to block 102. The method 100 proceeds instead to block 110 when the voltage data is not within normal ranges.

Block 110 includes determining whether the measured voltage data is indicative of an unrecoverable type of sensor fault, such as stuck-at-fault or out-of-range type faults. Such fault types may be indicated, with all control modules active, whenever data variance from the voltage sensor 59 is zero or very low (stuck-at-fault), or when more than a calibrated number of data points fall within a calibrated range of $CAN_H$ and $CAN_L$. The method 100 proceeds to block 128 when the fault is of the unrecoverable-type indicative of a sensor hardware error. A diagnostic code may be recorded in memory (M) of the host ECU 40 at this point. The method 100 otherwise proceeds to block 112 when the measured voltage data is indicative of a recoverable type of fault.

At block 112, for recoverable-types of faults, the host ECU 40 filters and processes the reported voltage data, i.e., the $CAN_H$ and $CAN_L$ data in the CAN bus example of FIG. 1. For recoverable types of faults, extracted two means of the reported data may deviate from normal or expected voltage levels. Block 112 may also include filtering out signal noise or performing other filtering operations. A non-limiting example embodiment for implementing block 112 is set forth in FIG. 3 and described below. The method 100 proceeds to block 114 using the filtered voltage data.

Block 114 entails determining, via the host ECU 40, whether the filtered voltage data is sufficiently informative. Block 114 may include comparing the filtered voltage data, e.g., the extracted two means, to a corresponding threshold to determine if the extracted means are too close together, or if an extracted mean is zero. The method 100 proceeds to block 126 when the voltage data is insufficiently informative, and to block 116 in the alternative.

At block 116 the method 100 uses the filtered data from block 112 and a recorded decision tree to determine whether an "ECU ground offset fault", i.e., a high resistance on the electrical ground of the host ECU 40, is present at a node other than the node where the voltage sensor 59 resides. That is, two different types of ground faults may exist: an offset ground in which a ground path to a given controller or ECU has a voltage drop, but not enough of one to impact the power-on status of the controller/ECU, and a floating ground in which the ground path has sufficient voltage drop to remove power to the controller/ECU. In the second case, stalling of the vehicle 11 may result depending on the controller(s)/ECU(s) affected by the fault. Example ground faults can be caused by wire harnesses and connector faults with respect to the host ECU 40.

Block 116 may entail, by way of example, reading the $CAN_H$ and $CAN_L$ data and finding an average voltage of a dominant bit within a given data frame of a message. The voltages can then be compared to predefined thresholds to detect and isolate the ECU ground fault. The average recessive voltage is 2.5 VDC and the dominant voltage is 3.5 VDC for $CAN_H$ (1.5 VDC for $CAN_L$) when grounding is normal. When one or more of the control modules have a ground that is offset, however, the transmitted voltage for such control modules will tend to be pulled up. $CAN_H$ and $CAN_L$ are pulled up when the impacted control module transmits frame data, and during the inter-frame region between data transmissions. Thus, detection of such a response is a way to detect the ECU ground fault offset. The method 100 proceeds to block 128 when the ECU ground offset fault is detected. The method 100 proceeds in the alternative to block 118 when the recoverable fault is not an ECU ground offset fault.

At block 118, the method 100 uses the filtered voltage data from block 112 to determine whether the recoverable fault is an "out-of-upper-range" fault. The method 100 proceeds to block 128 when this type of fault is detected. The method 100 proceeds in the alternative to block 120 when the recoverable fault is not an out-of-upper-range fault.

Block 120 includes determining whether the filtered voltage data from block 112 is indicative of an ECU ground offset combined with a recoverable sensor fault. Block 120 may include, again with all controllers on the communications bus 50 being active, finding more than two clusters of bus voltage data and not enough data points available at a normal bus voltage level, i.e., relative to a calibrated number of data points. The method 100 proceeds to block 128 when such a combination is detected. The method 100 proceeds in the alternative to block 122 when the fault is not a combined ECU ground offset and a recoverable sensor fault.

Block 122, which is reached in response to a negative decision at block 120, includes determining whether the filtered voltage data from block 112 is indicative of a recoverable sensor fault. The signature for such a fault may be, with all controllers active, that extracted two means deviate from normal data levels. The method 100 proceeds to block 128 when a recoverable sensor fault combination is detected. The method 100 proceeds in the alternative to block 124 when the recoverable sensor fault is not detected.

At block 124, the host ECU 40 determines from the forgoing steps whether the voltage sensor 59 of FIG. 1 is functioning normally. If so, the method 100 proceeds to block 128. The method 100 otherwise proceeds to block 126.

Block 126, reached from block 114 when the data from the voltage sensor 59 is not informative or from block 124 when a decision is made that the voltage sensor 59 is not functioning normally, includes registering a diagnostic code indicative of an unknown sensor status. The method 100 then proceeds to block 128.

Block 128 includes repeating blocks 102-126 a calibrated number of time to allow an opportunity for transient faults to clear. The method 100 then proceeds to block 130.

At block 130 the host ECU 40 next removes outliers in the bus data and recalibrates the voltage sensor 59. An example implementation of block 130 is depicted in FIG. 4 and described below. The method 100 then proceeds to block 131.

Block 131 entails ending the diagnostic and prognostic portions of the method 100, and then proceeding to block 132.

ECU Network Diagnosis and Prognosis

The remainder of method 100, i.e., blocks 132-138, pertains to resident diagnostic algorithms of the communications bus 50 as a whole, including network faults and ground faults of the host ECU 40. Thus, block 132 includes verifying whether the voltage sensor 59 of FIG. 1 is performing normally/as expected, effectively confirming the decision made at block 124, with this evaluation performed in blocks 102-124 as set forth above. The method 100 proceeds to block 134 whenever the results of block 132 are indicative of a normally-functioning voltage sensor 59. The method 100 proceeds directly to block 136 when the sensor is not performing normally or as expected.

At blocks 134 and 136, the host ECU 40 initiates diagnostics and prognostics of the bus 50 hardware and software, respectively, and then proceeds to block 138. Blocks 134 and 136 are executed when the voltage sensor 59 is deemed to be normal, i.e., hardware and software-based algorithms may be used because the data from the voltage sensor 59 may be relied on. Block 134 pertains to existing algorithms relying on the bus voltage ($CAN_H$, $CAN_L$) to diagnose the bus 50. Block 136 performs diagnostics using processing of bus messages, and thus does not rely on the bus voltage (arrow $V_{50}$) from the voltage sensor 59 of FIG. 1. Therefore, block 136 is executed without executing block 134 when the voltage sensor 59 is deemed not to be normal, i.e., the hardware of the voltage sensor 59 cannot be relied on to provide data suitable for diagnostics, so software-based diagnostics and prognostics are used in the alternative.

At block 138, the host ECU 40 fuses the results of diagnostics from blocks 134 and 136 and then proceeds to block 140. Block 138 may entail fusing the results of blocks 134 and 136 when block 132 confirms that the voltage sensor 59 is behaving normally, or bypassing block 134 when the voltage sensor 59 is not behaving normally.

Block 140 includes recording the results from block 138, e.g., as a diagnostic code or corresponding diagnostic result, which signifies the end of one control loop of the method 100. The method 100 thereafter returns to block 102.

FIG. 3 depicts an example embodiment of a sub-process 112A for implementing block 112 of the method 100 shown in FIG. 2. In general, the $CAN_H$ and $CAN_L$ data is segmented based on measured voltage level, after which segments containing noise are discarded. The mean of the remaining lowest data segments is the estimated $CAN_H$ recessive and $CAN_L$ dominant levels. Using $CAN_H$–$CAN_L$ data synchronization, the data whose mean is the estimated $CAN_L$ recessive level ($CAN_H$ dominant level) can then be identified and filtered.

For example, block 201 may include receiving the high-side/low-side ($CAN_H$ and $CAN_L$) data, and then proceeding to block 203 where the host ECU 40 segments the data equally between a maximum and a minimum of the data. $CAN_H$ data is typically between 2.5-3.5 VDC, and CANL data is typically between 1.5-2.5 VDC. The sub-process 112A proceeds to block 205 when the data has been segmented.

Block 205 includes counting the number of data points in each of the segments, and then, at block 207, removing data from a segment if the number of data points in the segment is below a calibrated noise threshold. The sub-process 112A then proceeds to block 209.

At block 209, the sub-process 112A then determines if blocks 203-207 have been repeated a calibrated number of times, e.g., two times, and if so, the sub-process 112A proceeds to block 211. If not, the sub-process 112A returns to block 203.

Block 211 includes labeling a segment in logic of the host ECU 40 if the number of data points exceeds a threshold. When adjacent segments have more data points than the cluster threshold, the segments may be combined. The sub-process 112A then proceeds to block 213.

At block 213 the host ECU 40 determines whether the $CAN_H$ and $CAN_L$ data is synchronized, i.e., collected at the same moment in time, and proceeds to block 215 when this is true. The sub-process 112A proceeds instead to block 225 when the $CAN_H$ and $CAN_L$ data is not synchronized.

Block 215 includes determining whether data in the lower three segments is closer to dominant data and the total number of data points is lower than the bus idle percentage. If so, the sub-process 112A proceeds to block 217. The sub-process 112A otherwise proceeds to block 219.

At block 217 the host ECU 40 reduces the mean extraction threshold by 50%, and then proceeds to block 219.

At block 219 the host ECU 40 finds the segment having the lowest voltage whose number of data points exceeds/is less than a mean extraction threshold. These segments are labeled in logic as a $CAN_H$ recessive and a $CAN_L$ dominant segment, respectively. In other words, the lowest voltage corresponds to the recessive bit of $CAN_H$ data or the dominant bit of the $CAN_L$ data. The sub-process 112A proceeds to block 221.

Block 221 includes calculating the mean of the $CAN_H$ recessive segment as an estimated $CAN_H$ recessive voltage, and calculating the mean of the $CAN_L$ dominant segment as an estimated $CAN_L$ dominant voltage. Corresponding mean data maybe calculated for the $CAN_H$ dominant data. The sub-process 112A then proceeds to block 223.

Block 223 includes filtering the bus data from block 221, e.g., by removing outliers from the $CAN_L$ recessive, and then recalculating the values from block 221 before proceeding to block 225.

At block 225, the maximum and minimum of the filtered data is determined, and the mean of this data is calculated, i.e., $$\frac{(max + min)}{2},$$

as an estimated $CAN_H$ dominant voltage or $CAN_L$ recessive voltage depending on the value being calculated. The mean of data below this level is the $CAN_H$ recessive voltage (or $CAN_L$ dominant voltage). The sub-process 112A is complete.

FIG. 4 depicts an example embodiment of a sub-process 130A for implementing block 130 of the method 100 shown in FIG. 2. In this embodiment, given an array of estimated $CAN_H$ and $CAN_L$ levels from independent datasets, the Thompson Tau Test maybe employed to remove outliers, if present. The filtered array of estimated $CAN_H$ and $CAN_L$ levels are then averaged, with the average thereafter used for sensor recalibration.

Specifically, block 301 includes inputting two arrays of estimated dominant and recessive raw means, without calibration, for the $CAN_H$ data before proceeding to block 303.

Block 303 includes, for the $CAN_H$ data of block 301, calculating the mean and standard deviation before proceeding to block 305.

At block 305, the sub-process 130A includes determining an outlier rejection region using the Thompson Tau test. If a data point is outside of the rejection region, the host ECU 40 removes it as an outlier and proceeds to block 307.

At block 307, the host ECU 40 determines if the outlier found in the last loop and the $CAN_H$ dominant array have more than a predetermined number of elements, e.g., three elements. If so, block 303 is repeated. The sub-process 130A proceeds to block 309 in the alternative.

Block 309 includes averaging the remaining array as a final estimated $CAN_H$ dominant voltage. The same process may be followed to derive the $CAN_H$ recessive voltage before proceeding to block 311.

At block 311, the host ECU 40 repeats the above process to derive the final estimates dominant and recessive voltages for $CAN_L$ data, and then proceeds to block 313.

At block 313 the host ECU 40 estimates a current equivalent scaling factor (a) and bias (b) as follows:

$$a = \frac{V_{REC} - V_{DOM}}{NORM_{REC} - NORM_{DOM}}$$

$$b = V_{REC} - a \cdot NORMV_{DOM}$$

where $V_{REC}$ and $V_{DOM}$ are the raw recessive and dominant voltages calculated from the sensor data using the above-described procedure, and $NORMAL_{REC}$ and $NORM_{DOM}$ are the respective normal (theoretical) recessive and dominant voltage, respectively. All four values are for $CAN_H$ or $CAN_L$ data, i.e., the $CAN_H$ and $CAN_L$ data is not mixed. Thus, to determine recalibratable parameters for the scaling factor (a) and bias (b) for the $CAN_H$ channel, data is used from the $CAN_H$ channel with a normal value of 2.5 to 3.5 VDC. For $CAN_L$, the sensor data is used for $CAN_L$ with a normal value of 1.5-2.5 VDC.

Using the method 100 as set forth above, therefore, a physical model-based approach is enabled for detecting, isolating, and recovering certain types of voltage sensor faults in a low-voltage serial communications bus architecture, including but not limited to the CAN bus depicted in FIG. 1. The method 100 is passively implemented using available bus voltage data, with no additional required hardware. Use of the method 100 is thus intended to ensure the accuracy of existing network diagnostic and prognostic algorithms, with the goal of reducing false positive or negative results via such algorithms.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system comprising:
a plurality of control modules;
a low-voltage serial communications bus having a bus voltage;
a voltage sensor configured to measure the bus voltage; and
a host electronic control unit (ECU) in communication with the voltage sensor and the control modules via the communications bus, wherein the host ECU is configured to:
convert the measured bus voltage from the voltage sensor to bus voltage data via an analog-to-digital converter;
compare the bus voltage data to a calibrated voltage range to detect a bus fault;
isolate the detected bus fault as a recoverable fault using a data pattern in the bus voltage data when the bus voltage data is outside of the calibrated voltage range; and
recalibrate the voltage sensor to thereby mitigate the detected recoverable fault;
wherein the host ECU is further configured to detect a non-recoverable "stuck-at-fault"-type fault using the data pattern, including determining whether the control modules are transmitting and receiving messages on the communications bus and a variance in the bus voltage data is less than a threshold variance, and thereafter recording a diagnostic code in memory of the host ECU indicative of the "stuck-at-fault"-type fault.

2. The system of claim 1, wherein the host ECU is configured to recalibrate the voltage sensor by adjusting one or both of a scaling factor and a bias value.

3. The system of claim 1, wherein the system is a vehicle, the communications bus is a controller area network bus, and the bus voltage data includes high-side data in a range of 2.5-3.5 VDC and low-side data in a range of 1.5-2.5 VDC.

4. The system of claim 1, wherein the host ECU is configured, in response to the "stuck-at-fault"-type fault, to execute a software-based prognostic and diagnostic process of a network without using the bus voltage data.

5. The system of claim 1, wherein the host ECU is further configured to detect a non-recoverable "out-of-range"-type fault using the data pattern, including determining whether the control modules are transmitting and receiving messages on the communications bus and more than a predetermined number of data points of the bus voltage data falling outside of a calibrated range of a mean of high-side data, and thereafter recording a diagnostic code in memory of the host ECU indicative of the "out-of-range"-type fault.

6. The system of claim 5, wherein the host ECU is configured, in response to the "out-of-range"-type fault, to execute a software-based prognostic and diagnostic process of a network without using the bus voltage data.

7. The system of claim 1, wherein the host ECU is further configured to detect a presence of a ground offset fault, including calculating an average of a dominant bit within a given data frame of a series of bus messages and comparing the calculated average to a predefined threshold.

8. The system of claim 1, wherein the host ECU is further configured to detect a presence of a ground offset fault combined with the recoverable fault by detecting a plurality of clusters of the bus voltage data and an insufficient number of data points of the bus voltage data at a normal bus voltage level, and to remove outliers in the bus voltage data prior to recalibrating the voltage sensor.

9. The system of claim 8, wherein the host ECU is configured to remove the outliers by segmenting the bus voltage data equally between a maximum and a minimum of the bus voltage data, counting the number of data points in each segment, and removing the bus voltage data from a given one of segments if the number of data points in the given one of segments is below a calibrated noise threshold.

10. A method for detecting, isolating, and mitigating a recoverable fault in a low-voltage communications network bus having a host electronic control unit (ECU) connected to a plurality of control modules, the method comprising:
measuring a bus voltage using a voltage sensor, wherein the measured bus voltage is the same for the host ECU and the control modules;
converting the measured bus voltage to bus voltage data via an analog-to-digital converter, the bus voltage data including high-side data and low-side data indicative of the measured bus voltage;
comparing the bus voltage data to a calibrated voltage range, via the host ECU, to thereby detect a bus fault on the low-voltage communications network bus;
isolating the detected bus fault, via the host ECU, as the recoverable fault using a data pattern in the bus voltage data when the bus voltage data is outside of the calibrated voltage range; and recalibrating the voltage sensor via the host ECU to thereby mitigate the detected recoverable fault;

isolating a non-recoverable "stuck-at-fault"-type of fault via the host ECU using the data pattern, including determining whether the control modules are transmitting and receiving messages on the low-voltage communications network bus and a variance in the bus voltage data is less than a threshold variance, and thereafter recording a diagnostic code in memory of the host ECU indicative of the "stuck-at-fault"-type of fault.

11. The method of claim 10, wherein the low-voltage communications network bus is a controller area network (CAN) bus of a vehicle, and outputting the bus voltage data includes outputting the high-side data in a range of 2.5-3.5 VDC and the low-side data in a range of 1.5-2.5 VDC.

12. The method of claim 10, wherein recalibrating the voltage sensor includes adjusting one or both of a scaling factor and a bias value.

13. The method of claim 10, further comprising, in response to the "stuck-at-fault"-type of fault, executing a software-based prognostic and diagnostic process of the low-voltage communications network bus without using the bus voltage data.

14. The method of claim 10, further comprising detecting a non-recoverable "out-of-range"-type of fault using the data pattern, including determining whether the control modules are transmitting and receiving messages on the low-voltage communications network bus and more than a predetermined number of data points of the bus voltage data falling outside of a calibrated range of a mean of the high-side data, and thereafter recording a diagnostic code in memory of the host ECU indicative of the "out-of-range"-type of fault.

15. The method of claim 14, further comprising, in response to the "out-of-range"-type of fault, executing a software-based prognostic and diagnostic process of the low-voltage communications network bus without using the bus voltage data.

16. The method of claim 10, further comprising detecting a presence of a ground offset fault via the host ECU, including calculating an average of a dominant bit within a given data frame of a series of bus messages and comparing the calculated average to a predefined threshold.

17. The method of claim 10, further comprising detecting a presence of a ground offset fault combined with the recoverable fault by detecting a plurality of clusters of the bus voltage data and an insufficient number of data points of the bus voltage data at a normal bus voltage level, and removing outliers in the bus voltage data prior to recalibrating the voltage sensor.

18. The method of claim 17, wherein removing the outliers includes segmenting the bus voltage data equally between a maximum and a minimum of the bus voltage data, counting the number of data points in each segment, and removing the bus voltage data from a given one of segments if the number of data points in the given one of segments is below a calibrated noise threshold.

\* \* \* \* \*